United States Patent Office 3,356,696
Patented Dec. 5, 1967

3,356,696
METHOD FOR INTRODUCING AN OXYGEN FUNCTION INTO A STEROID MOLECULE CONTAINING A KETO GROUP
John N. Gardner, Wayne, N.J., assignor to Schering Corporation, Bloomfield, N.J., a corporation of New Jersey
No Drawing. Filed May 24, 1965, Ser. No. 458,386
10 Claims. (Cl. 260—397.4)

This invention relates to an improved process for the introduction of hydroxy groups into steroid molecules containing a ketone function and, more particularly, to a single-stage process whereby a hydroxy group may be introduced into a steroid molecule on a tertiary carbon atom adjacent to a ketone function.

Since many important pharmacologically active steroids are characterized by the presence of one or more hydroxy groups, and particularly a 17α-hydroxy group, methods for the introduction of such groups have been the subject of exhaustive and continuing research. Many methods, both chemical and microbiological, have been described in the chemical literature for effecting hydroxylation of steroid molecules which, in practical application, have met with varying degrees of success. These processes, however, have displayed in general one or more disadvantages including, for example, requiring a plurality of separate stages; often giving poor and/or unpredictable yields; and frequently requiring reaction conditions which give rise to interference by other substituents and/or competitive and undesirable side-reactions. The state of the art to-date, therefore, still leaves to be desired a direct and specific process for introducing hydroxy groups into steroid molecules in high and uniform yield.

In the more recent literature, however, there has been described a new process for introducing a hydroxy group into steroid molecules which offers distinct advantages over methods peviously known (see, for example, United States Patent No. 3,056,809, issued Oct. 2, 1962). This new process was based upon the discovery that steroid enols, prepared from the corresponding keto-steroids, could be reacted with oxygen to introduce a hydroperoxy group which, when stable, could be readily reduced to a hydroxy group. It was found that the hydroperoxy group was formed on a nuclear carbon atom adjacent to the hydroxy group of the enol function (excepting enols formed from α:β-unsaturated ketones where the hydroperoxy group might appear at the γ-position) and that such hydroperoxy group was sufficiently stable to permit isolation and subsequent reduction to a hydroxy group when the nuclear carbon atom to which it was attached was tertiary. Further, it was observed that this process afforded a degree of stereo specificity depending upon the precise structure of the starting material; only the isomers of α-configration being obtained, for example, upon oxygenation of 6- and 20-ketones.

The enol steroids employed in the process described above were obtained from the corresponding keto steroid by employing as the enolizing medium a solution of a strong base in a suitable solvent. Among the strong bases described as particularly useful were alkali metal alkoxides of tertiary aliphatic alcohols including, for example, the sodium or potassium alkoxides of tertiary butanol or tertiary amyl alcohol. Substantially anhydrous alcohols were the preferred solvents and, where the strong base was an alkoxide, it was found especially convenient to employ the alcohol from which the alkoxide was derived. Desirably the base was used in excess over the steroid in an amount of 8–20 molar equivalents of the steroid.

Oxygenation according to this process was carried out by agitating a solution of the keto steroid in the basic enolizing medium. The reaction, if desired, could be carried out under pressure. Although temperatures varying from 0° to 35° C. could be employed, it was preferred to carry out the reaction at or around ambient temperature since it was observed that temperatures below ambient often resulted in decreased yields.

Isolation of the relatively stable tertiary hydroperoxide could be effected in any convenient manner including, for example, by making the reaction mixture slightly acid and then precipitating the hydroperoxide with water or, alternatively, by extraction of the hydroperoxide followed by evaporation of the solvent to dryness. The hydroperoxide so obtained was then reduced to the corresponding hydroxy compound by conventional techniques such as, for example, by catalytic hydrogenation (using palladium on charcoal as a typical catalyst) or by employing chemical reducing agents including, for example, zinc in acetic acid, potassium iodide in acetic acid or sodium sulphite.

Although the process as described above affords a simple and relatively direct means for introducing a hydroxy group into certain steroid molecules wherein the yields are often good as compared with other known methods for introducing hydroxy groups, it presents in itself several difficulties which mitigate against its usefulness as a generally applicable process on an industrial scale. Like many of the prior methods this process requires at least two separate stages which unavoidably involve concomitant loss of yield at each stage. Further, the process in actual practice has been found unsuitable for large scale operation since the yields are often erratic and the keto steroid used as substrate for the reaction is frequently adversely affected by the strongly basic enolizing medium under the conditions advocated.

Accordingly, it is the object of the present invention to provide an improvement in the prior art process by which the above-disadvantages are substantially overcome. More specifically, it is the object of this invention to provide an improvement in the prior art process which will permit the simultaneous formation of the desired hydroperoxy function and its in situ reduction to a hydroxy group in a single-stage reaction with high and uniform yield.

The instant invention is based upon the discovery that these and other advantages can be achieved by including directly in the reaction medium used for the oxygenation a tri-lower alkylphosphite as a reducing agent. Under these conditions, the hydroperoxy function obtained by oxygenation is reduced as soon as it is formed and its concentration in the reaction never exceeds a miniscule amount. This process is especially advantageous since it not only eliminates completely the need for isolation and subsequent reduction of the relatively sensitive hydroperoxide but rapidly converts the hydroperoxy function to the more stable hydroxy group.

In its process aspect, therefore, the instant invention may be described as residing in the concept of an improvement in that process for the introduction of a hydroxy function onto at least one tertiary carbon atom of a steroid molecule adjacent to a keto group characterized by reacting said keto steroid with molecular oxygen in the presence of strongly basic enolizing agent to yield a stable hydroperoxy function on a tertiary carbon atom adjacent to said keto group and thereafter isolating said hydroperoxide and reducing the hydroperoxy function to a hydroxy group; the said improvement comprising carrying out said reaction with molecular oxygen in the presence of a tri-lower alkylphosphite thereby introducing said hydroperoxy function and simultaneously reducing it in situ to a hydroxy group.

As used herein, the term, tri-lower alkyl phosphite, is intended to include straight and branched chain tri-alkyl phosphites having from 1 to 8 carbon atoms in each alkyl moiety. Typical of tri-lower alkyl phosphites useful in the process of this invention are, for example, trimethylphosphite, triethylphosphite, tripropylphosphite, tributylphosphite, tri-isopropylphosphite, tri-isobutylphosphite, trihexylphosphite, trioctylphosphite, etc. Particularly preferred phosphites, largely based on ready availability, are trimethylphosphite, triethylphosphite, tripropylphosphite, tributylphosphite and tri-isobutylphosphite. When in contact with the oxygenation medium, the tri-lower alkyl phosphites are not subject to attack by molecular oxygen, yet readily reduce the hydroperoxy function when formed to the hydroxy group. At least one molar equivalent of the phosphite per molar equivalent of steroid is added directly to the oxygenation medium for each reducible hydroperoxy function to be formed in the steroid molecule (i.e. where only one hydroperoxy function is to be formed in the steroid molecule, at least one mole of phosphite per mole of steroid is employed—where two or more hydroperoxy functions are to be formed in the steroid molecule, at least a corresponding number of moles of phosphites per mole of steroid must be used).

The strongly basic enolizing agents used in the process of the instant invention may be those described in connection with the prior art process. Among these strong bases are included, for example, alkali metal alkoxides of tertiary aliphatic alcohols, alkali metal hydrides, alkali metal amides, and hindered alkali metal alkyl derivatives such as sodium triphenyl methyl. Primary and secondary alkoxides and tetraalkyl ammonium hydroxides are also suitable. Particularly useful as enolizing agents are the alkali metal alkoxides of tertiary aliphatic alcohols including, for example, the sodium and potassium alkoxides of tertiary butanol and tertiary amyl alcohol. Commercially available alkali metal alkoxides may be employed where available or, preferably, the alkali metal alkoxide may be formed in situ by the action of an alkali metal hydride on the desired tertiary aliphatic alcohol. Although, in the prior art process, the base is used in excess over the steroid in an amount of from about 8 to about 20 molar equivalents of the steroid, it has been found that a smaller excess, about 1 to about 5 molar equivalents, may be employed.

As solvents suitable for the process of the instant invention, there may be employed any of those solvents described in connection with the prior art process including substantially anhydrous alcohols and, where the strong base is an alkoxide, especially the alcohol from which the alkoxide was derived. The solvent, however, need not be limited to those specifically mentioned in the prior art. Any non-reactive polar organic solvent or solvent mixture may be employed which is liquid at the reaction temperature and which is insensitive to molecular oxygen. Included among such solvents are, for example, tetrahydrofuran, tetrahydropyran, dimethoxyethane and the like. Tetrahydrofuran and dimethoxyethane have been found particularly suitable.

Contrary to the teachings of the prior art, it has been found that reaction temperatures substantially below those heretofore recommended can be advantageously employed. Applicant has found that the process of this invention may be carried out at a reaction temperature in the range between about 0° to about −40° C., about −20° C. being particularly satisfactory since at this temperature the reaction will proceed at adequate speed while any undesirable side reactions involving the steroidal substrate are substantially depressed (while higher reaction temperatures may be employed, reductions in yield at such temperatures are to be anticipated).

In general the process of this invention may be carried out any one of three ways:

(a) The steroid, as a fine suspension in the solvent, is cooled to the desired reaction temperature. The tri-lower alkyl phosphite is introduced. Oxygen is bubbled through the mixture and the strongly basic enolizing agent is added in one lot. Reaction is continued to completion which, depending upon the nature of the steroid, the strength of the enolizing medium and the reaction temperature, may require from about .5 to about 24 hours.

(b) The strongly basic enolizing agent is dissolved in the solvent and the solution is cooled to the desired reaction temperature. The tri-lower alkyl phosphite is added and oxygen is bubbled through the mixture. Finely divided steroid is added in portions over several minutes and the reaction is continued until complete. Again, the reaction time will depend upon the temperature and may vary as above.

(c) In a preferred method, an alkali metal alkoxide of a tertiary aliphatic alcohol is employed as the enolizing agent and it is formed in situ through the action of an alkali metal hydride on a teritary aliphatic alcohol. The reaction is carried out by dissolving the alkali metal hydride (employed usually as a 50 percent dispersion in mineral oil) in a mixture of a tertiary aliphatic alcohol and the reaction solvent. The tri-lower alkyl phosphite is added and the mixture is cooled to the desired reaction temperature. Oxygen is bubbled through the reaction mixture and the steroid, either in solution or suspension in an additional quantitity of reaction solvent or as a finely divided powder, is introduced in portions over several minutes. The reaction is continued until complete as described above.

The crude hydroxylated steroid is recovered by pouring the reaction mixture into water, or vice versa, and separating the solids thus precipitated by filtration. In general, the reaction mixture is made slightly acid prior to precipitation in order to fully neutralize the basic medium and to insure complete conversion of any steroidal alkali metal alcoholate into the free alcohol. The crude hydroxylated steroid may be purified by recrystallization from suitable organic solvents, or from solvent mixtures, including, for example, methanol, ethylacetate, methanol-ethylacetate, benzene, acetone, acetone-hexane, dichloromethane-hexane and the like.

The best mode contemplated by applicant for carrying out the improved process of the instant invention is illustrated in the following examples. No limitation, however, is intended except as set forth in the appended claims:

EXAMPLE 1

*3β,17α-dihydroxy-16β-methyl-5α-pregnan-20-one 3-acetate*

Dissolve 3.5 g. of potassium tertiary butoxide in 52 cc. of dimethylformamide and 8 cc. of tertiary butanol. Cool the solution to −20° C. and add 3 ml. of triethylphosphite. Bubble oxygen through the solution. Add 5 g. of finely powdered 3β-hydroxy-16β-methyl - 5α-pregnan-20-one 3-acetate in portions over about 5 minutes. Continue the reaction for an additional 20 to 30 minutes at −20 to −10° C. Discontinue the oxygen stream and make the reaction mixture slightly acid with acetic acid. Pour the reaction mixture into water and recover the precipitate by filtration. Purify the crude precipitate by recrystallization from methanol (M.P. 152–155° C.)

EXAMPLE 2

*3β,17α-dihydroxy-16β-methyl-5α-pregnan-20-one*

Dissolve 5 g. of 3β,17α-dihydroxy - 16β-methyl-5α-pregnan-20-one 3-acetate as prepared in Example 1 in a mixture of 75 cc. of methanol, 25 cc. of water and 2 g. of potassium hydroxide. Stir the solution at room temperature for about 1 hour and neutralize with acetic acid. Pour the reaction mixture into water and recover the precipitate by filtration. Purify the crude precipitate by recrystallization from methanol (M.P. 255–260° C.)

EXAMPLE 3

*3β,17α-dihydroxy-16β-methyl-5α-pregnan-20-one 3-acetate*

Dissolve 7.5 g. of sodium hydride (as a 50 percent dispersion in mineral oil) in 100 ml. of tertiary butanol and 150 ml. of dimethylformamide. Add 25 ml. of triethylphosphite in 100 ml. of dimethylformamide. Cool the solution to about −25° C. and pass a steady stream of oxygen through the liquid. Add a soltion of 50 g. of 3β-hydroxy-16β-methyl - 5α-pregnan-20-one 3-acetate in 120 ml. of tetrahydrofuran over a period of about 10 minutes and continue the reaction for a further 45 to 60 minutes. Discontinue the oxygen stream and neutralize the reaction mixture with acetic acid. Allow the reaction mixture to reach room temperature. Pour the reaction mixture into water and separate the precipitate by filtration. Recrystallize the crude precipitate from methanol-ethyl acetate.

EXAMPLE 4

*3β,17α-dihydroxy-16β-methyl-5α-pregnan-20-one*

(a) Following the procedure of Example 2, hydrolyze the 3β,17α-dihydroxy - 16β-methyl - 5α-pregnan-20-one 3-acetate as prepared in Example 3 to obtain 3β,17α-dihydroxy-16β-methyl-5α-pregnan-20-one.

(b) Alternatively, to prepare 3β,17α-dihydroxy - 16β-methyl-5α-pregnan-20-one directly from 3β-hydroxy-16β-methyl-5α-pregnan-20-one 3-acetate without isolation of the 3β,17α-dihydroxy 3-acetate, follow exactly the process described in Example 3 continuing the passage of oxygen through the reaction mixture for 45 to 60 minutes after completing the addition of the steroid. Replaces the oxygen stream with nitrogen. Add to the reaction mixture a solution of 5 g. of sodium hydroxide in 150 ml. of a 2 to 1 mixture of methanol and water. Allow the reaction mixture to warm to room temperature and agitate for 1 hour. Neutralize the reaction mixture by the addition of acetic acid and pour it into water. Separate the solids by filtration and purify the crude product by recrystallization from methanol-ethyl acetate.

EXAMPLE 5

*3β,17α-dihydroxy-5α-pregnan-20-one*

Dissolve 15 g. of sodium hydride (as a 50 percent dispersion in mineral oil) in 100 ml. of tertiary butanol and 150 ml. of dimethylformamide. To this solution, add 25 ml. of triethylphosphite in 100 ml. of dimethylformamide. Cool the resulting solution to about −25° C. and pass a steady stream of oxygen through the liquid. Add a solution of 14.8 g. of 3β-hydroxy-5α-pregnan-20-one 3-acetate in 120 ml. of tetrahydrofuran over a period of 5 to 10 minutes. Continue the reaction for an additional 45 to 60 minutes. Replace the oxygen stream with nitrogen and add a solution of 5 g. of sodium hydroxide in 150 ml. of a 2 to 1 mixture of methanol and water. Allow the reaction mixture to warm to room temperature and agitate for 1 hour. Make the reaction mixture slightly acid with acetic acid and pour it into water. Recover the precipitate by filtration and purify by recrystallization from acetone (M.P. 250–258° C.).

EXAMPLE 6

*3β,17α-dihydroxy-6,16β-dimethyl-5-pregnen-20-one*

Dissolve 7.5 g. of potassium hydride (as a 50 percent dispersion in mineral oil) in 150 ml. of dimethylformamide to which has been added 100 ml. of tertiary amyl alcohol. Add a solution of 25 ml. of trimethylphosphite in 100 ml. of dimethylformamide and cool the solution to about −25° C. Pass a steady stream of oxygen through the liquid and add a solution of 50 g. of 6,16β-dimethyl-3β-hydroxy-5-pregnen-20-one 3-acetate in 120 ml. of tetrahydrofuran over a period of about 10 minutes. Continue the passage of oxygen for a further 45 to 60 minutes and then replace the oxygen stream with nitrogen. Add a solution of 5 g. of potassium hydroxide in 150 ml. of a 2 to 1 mixture of methanol and water. Allow the reaction mixture to warm to room temperature and agitate for 1 hour. Slightly acidify the reaction mixture and pour it into water. Separate the solids by filtration and purify the crude product by recrystallization from ethanol (M.P. 175–182° C.).

EXAMPLE 7

*3β,17α-dihydroxy-6,16β-dimethyl-5-pregnen-20-one 3-acetate*

Repeat exactly the process described in Example 6 continuing the passage of oxygen through the reaction mixture for a period of 45 to 60 minutes after completing the addition of the steroid. Make the reaction mixture slightly acid with acetic acid and allow it to warm to room temperature. Pour the reaction mixture into water and separate the solids by filtration. Recrystallize the crude product from methanol-ethyl acetate (M.P. 159–163° C.).

EXAMPLE 8

*3β,17α-dihydroxy-16β-methyl-5-pregnen-20-one*

Dissolve 0.75 g. of sodium hydride (as a 50 percent dispersion in mineral oil) in 10 ml. of tertiary butanol and 15 ml. of tetrahydrofuran. Add a solution of 3 ml. of triethylphosphite in 25 ml. of tetrahydrofuran. Cool the mixture to about −25° C. Pass a steady stream of oxygen through the liquid and add 5 g. of 3-hydroxy-16β-methyl-5-pregnen-20-one 3-acetate in 15 ml. of tetrahydrofuran in portions over a period of about 30 minutes. Continue the oxygen stream for an additional 2 hours. Discontinue the oxygen stream and add 10 ml. of water and 15 ml. of methanol. Allow the reaction mixture to reach room temperature and then boil for 10 minutes. Pour the reaction mixture into water containing a little acetic acid. Separate the precipitate by filtration and recrystallize from methanol-ethyl acetate (M.P. 225–238° C.).

EXAMPLE 9

*3β,17α-dihydroxy-16β-methyl-5-pregnen-20-one 3-acetate*

Repeat exactly the process described in Example 8 continuing the passage of oxygen through the reaction mixture for about 2 hours after completing the addition of the steroid. Slightly acidify the reaction mixture with acetic acid and allow it to warm to room temperature. Pour the reaction mixture into water and recover the precipitate by filtration. Purify the crude precipitate by recrystallization from dioxane (M.P. 165–172° C.).

EXAMPLE 10

*3β,17α-dihydroxy-16β-methyl-5α-pregnan-20-one*

Dissolve 1.5 g. of sodium hydride (as a 50 percent dispersion in mineral oil) in 20 ml. of tertiary butanol and add 30 ml. of dimethylsulfoxide and 3 ml. of triethylphosphite. Cool the solution to −10° C. Pass oxygen through the mixture and add 5 g. of 3β-hydroxy-16β-methyl-5α-pregnan-20-one 3-acetate in 20 ml. of tetrahydrofuran and 20 ml. of dimethylsulfoxide. Continue the reaction at 0° to −10° C. for an additional 15 minutes and allow the reaction to reach room temperature. Discontinue the oxygen stream and add a mixture of 3 g. of sodium hydroxide in 100 ml. of a 1 to 1 mixture of methanol and water. Agitate for 30 minutes at room temperature into slightly acidified water. Separate the solids by filtration and purify the crude product by recrystallization from ethyl acetate.

EXAMPLE 11

*3β,17β,9α-trihydroxy-5α-androstan-11-one 3,17-diacetate*

Dissolve 0.3 g. sodium hydride (as a 50% dispersion in mineral oil) in 1 ml. of tertiary butanol and 5 ml. of dimethoxyethane. Add 0.5 ml. of triethylphosphite, cool to −25° C. and pass a steady stream of oxygen through the liquid. Add a solution of 0.5 g. of 3β,17β-dihydroxy-5α-androstan-11-one 3,17-diacetate in 4 ml. dimethoxyethane over 2 minutes and continue the reaction for 2 hours. Discontinue the oxygen stream and neutralize the reaction mixture with acetic acid. Allow the reaction mixture to reach room temperature. Pour the reaction mixture into water and separate the precipitate by filtration. Recrystallize the crude precipitate from acetone-hexane.

EXAMPLE 12

3β,9α-dihydroxy-5α-pregnane-11,20-dione 3-acetate

Dissolve 0.3 g. of sodium hydride (as a 50% dispersion in mineral oil) in 1 ml. tertiary butanol and 5 ml. dimethylformamide. Add 0.5 ml. trimethylphosphite, cool to −25° C., and pass a steady stream of oxygen. Add a solution of 0.5 g. of 20,20-ethylenedioxy-3β-hydroxy-5α-pregnane-11-one 3-acetate in 4 ml. tetrahydrofuran over 4 minutes and continue the reaction for 1 hour. Discontinue the oxygen stream and acidify the reaction mixture with acetic acid. Add 5 ml. of water, warm at 60° C. for 15 minutes, then pour the reaction mixture into water and separate the precipitate by filtration. Recrystallize the crude precipitate from acetone-hexane (M.P. 208–211° C.).

EXAMPLE 13

17α-hydroxy-1,4-pregnadiene-3,20-dione

Dissolve 0.5 g. sodium hydride (as a 50% dispersion in mineral oil) in 1 ml. of tertiary butanol and 8 ml. of dimethylformamide. Add 0.5 ml. of triethylphosphite, cool to −20° C. and pass a steady stream of oxygen through the liquid. Add 0.5 g. 1,4-pregnadiene-3,20-dione in 5 ml. dimethylformamide over 5 minutes and continue the reaction for 45 minutes. Discontinue the oxygen stream, neutralize the reaction mixture with acetic acid and allow it to reach room temperature. Pour into water, separate the precipitate by filtration and crystallize from acetone-ethylacetate (M.P. 245–262° C.).

EXAMPLE 14

3β,9α,17α-trihydroxy-5α-pregnane-11,20-dione

Dissolve 0.6 g. of sodium hydride (as a 50% dispersion in mineral oil) in 2 ml. of tertiary butanol and 5 ml. of dimethylacetamide. Cool to −25° C. and add 1.5 ml. of tri-isopropylphosphite. Pass a steady stream of oxygen and add a solution of 0.5 g. of 3β-hydroxy-5α-pregnane-11,20-dione in 4 ml. of tetrahydrofuran over 5 minutes. Continue the reaction for 2 hours, then discontinue the oxygen stream and acidify the mixture with acetic acid. Allow to warm to room temperature, pour into water, isolate the precipitate by filtration and crystallize from methanol-ethylacetate.

EXAMPLE 15

16β-methyl-Δ9(11)-5α-pregnen-3β,17α-diol-20-one 3-acetate

Dissolve 7.5 g. of sodium hydride (as a 50% dispersion in mineral oil) in 100 ml. of tertiary butanol and 150 ml. of dimethylformamide. Add 25 ml. of triethylphosphite in 100 ml. of dimethylformamide. Cool the solution to about −25° C. and pass a steady stream of oxygen through the liquid. Add a solution of 50 g. of 16β-methyl-Δ9(11)-5α-pregnen-3β-ol-20-one 3-acetate in 120 ml. of tetrahydrofuran over a period of about 10 minutes and continue the reaction for a further 45 to 60 minutes. Discontinue the oxygen stream and neutralize the reaction mixture with acetic acid. Allow the reaction mixture to reach room temperature. Pour the reaction mixture into water and separate the precipitate by filtration. Recrystallize the crude product from methanol-ethylacetate (M.P. 171–174° C.).

As is readily apparent from the above examples, the process of this invention affords a new and simple single-stage method for the introduction of a hydroxy group onto at least one tertiary carbon atom of a steroid molecule adjacent to a keto group. In addition to the hydroxylations at C–9 and C–17 as illustrated above, the process may be employed for hydroxylation at other tertiary centers such as, for example, at C–5 (starting with a 6-ketone), at C–14 (starting with a 15-ketone) and at C–8 (starting with a 7-ketone). It is particularly advantageous when utilized as a step in the synthesis of those pharmaceutically active steroids characterized by the 20-keto-17α-hydroxy configuration. The process, however, is one of general applicability being useful in the hydroxylation of steroids such as pregnanes, androstanes, cholanes, cholestanes, estranes, spirostanes, etc. and the various unsaturated derivatives and homo and nor derivatives thereof having appropriately positioned keto groups.

Although the instant invention has been described above specifically in terms of the use of a tri-lower alkylphosphite as the reducing agent, many modifications in the reducing agent will suggest themselves to one skilled in the art. It will be obvious, of course, that any reducing agent can be employed which is compatible with the reaction mixture and which is insensitive to molecular oxygen. Among such reducing agents would be, for example, many trisubstituted phosphorous compounds, including such tri-hydrocarbyl phosphines as triphenyl phosphine, and salts of sulfinic acids including especially the alkali metal salts of lower alkyl sulfinic acids. Applicant considers all such modifications to be the full equivalent of the invention specifically disclosed herein and to fall within the scope of this invention.

The subject matter which applicant regards as his invention is particularly pointed out and distinctly claimed as follows:

1. In the process for the introduction of a hydroxy function onto at least one tertiary carbon atom of a steroid molecule adjacent to a keto group characterized by reacting said keto steroid with molecular oxygen in the presence of a strongly basic enolizing agent to yield a stable hydroperoxy function on a tertiary carbon atom adjacent to said keto group and thereafter isolating said hydroperoxide and reducing the hydroperoxy function to a hydroxy group; the improvement which comprises carrying out said reaction with molecular oxygen in the presence of a tri-lower alkyl phosphite having from 1 to 8 carbon atoms in each alkyl moiety thereby introducing said hydroperoxy function and simultaneously reducing it in situ to a hydroxy group.

2. The process according to claim 1 wherein the reaction is carried out at about −40° C. to about 0° C.

3. The process according to claim 2 wherein the tri-lower alkyl phosphite is selected from the group consisting of trimethylphosphite and triethylphosphite, tripropylphosphite, tributylphosphite and tri-isobutylphosphite.

4. The process according to claim 3 wherein the reaction is carried out in the presence of a non-reactive polar organic solvent selected from the group consisting of dimethoxyethane, tetrahydropyran and tetrahydrofuran.

5. The process of claim 3 wherein the keto steroid is a 20-keto steroid and the process is used to introduce a 17α-hydroxy group.

6. The process of claim 5 wherein the 20-keto steroid is 3β-hydroxy-16β-methyl-5α-pregnan-20-one 3-acetate.

7. The process of claim 5 wherein the 20-keto steroid is 3β-hydroxy-5α-pregnan-20-one 3-acetate.

8. The process of claim 5 wherein the 20-keto steroid is 3β-hydroxy-16β-methyl-5-pregnene-20-one 3-acetate.

9. The process of claim 5 wherein the 20-keto steroid is 1,4-pregnadiene-3,20-dione.

10. The process of claim 5 wherein the 20-keto steroid is 16β-methyl-Δ9(11)-5α-pregnen-3β-ol-20-one 3-acetate.

References Cited

UNITED STATES PATENTS 3,056,809  10/1962  Barton et al. _____ 260—397.4
3,074,976   1/1963  Zderic et al. _____ 260—397.4
3,074,977   1/1963  Mannhardt et al. ___ 260—397.4

LEWIS GOTTS, Primary Examiner.

J. R. BROWN, Assistant Examiner.